(12) United States Patent
Speckhart et al.

(10) Patent No.: US 6,823,236 B2
(45) Date of Patent: Nov. 23, 2004

(54) MATERIAL HANDLING APPARATUS

(75) Inventors: B. Stephen Speckhart, Short Hills, NJ (US); Alexander Flisfeder, Wayne, NJ (US); Jose Antonio Lopes, Elizabeth, NJ (US); Daniel Graham Tuttle, Bound Brook, NJ (US); David William Stecher, South Belmar, NJ (US); Christopher Allan Atwan, Union, NJ (US); Angel Francisco Hierrezuelo, Elizabeth, NJ (US)

(73) Assignee: White Conveyors, Inc., Kenilworth, NJ (US)

( * ) Notice: Subject to any disclaimer, the term of this patent is extended or adjusted under 35 U.S.C. 154(b) by 0 days.

(21) Appl. No.: 10/213,250

(22) Filed: Aug. 6, 2002

(65) Prior Publication Data

US 2004/0030442 A1 Feb. 12, 2004

(51) Int. Cl.[7] ................................................. G06F 7/00
(52) U.S. Cl. ........................ 700/215; 700/213; 700/214
(58) Field of Search ................................. 700/215, 213, 700/214, 232, 237; 198/358, 349.6, 465.4, 349; 186/52, 53; 209/937

(56) References Cited

U.S. PATENT DOCUMENTS

| | | | | |
|---|---|---|---|---|
| 4,239,435 A | * | 12/1980 | Weiss et al. | 198/349.8 |
| 4,803,348 A | * | 2/1989 | Lohrey et al. | 235/381 |
| 4,907,699 A | * | 3/1990 | Butcher et al. | 209/3.3 |
| 5,419,439 A | * | 5/1995 | Branch | 209/3.3 |
| 5,441,158 A | * | 8/1995 | Skinner | 209/583 |
| 5,660,261 A | * | 8/1997 | Speckhart et al. | 198/357 |
| 5,927,475 A | * | 7/1999 | Santicchi | 198/502.3 |
| 6,010,239 A | * | 1/2000 | Hardgrave et al. | 700/213 |
| 6,578,671 B2 | * | 6/2003 | Shen | 186/53 |

* cited by examiner

Primary Examiner—Khoi H. Tran
(74) Attorney, Agent, or Firm—Kenyon & Kenyon

(57) ABSTRACT

A material handling apparatus comprising a material delivery configuration configured with a first end and a second end, a transfer configuration connected to the first end of the garment delivery rail, a movable material handling arrangement configured to transfer at least one set of material on hangers supported by the arrangement, a computer, a user interface configured to accept, process and provide data to a user, the user interface connected to the computer to transfer and receive data, a clearing arrangement configured to remove material from the material delivery configuration; and an enclosure configured to separate a user from the movable material handling arrangement.

34 Claims, 13 Drawing Sheets

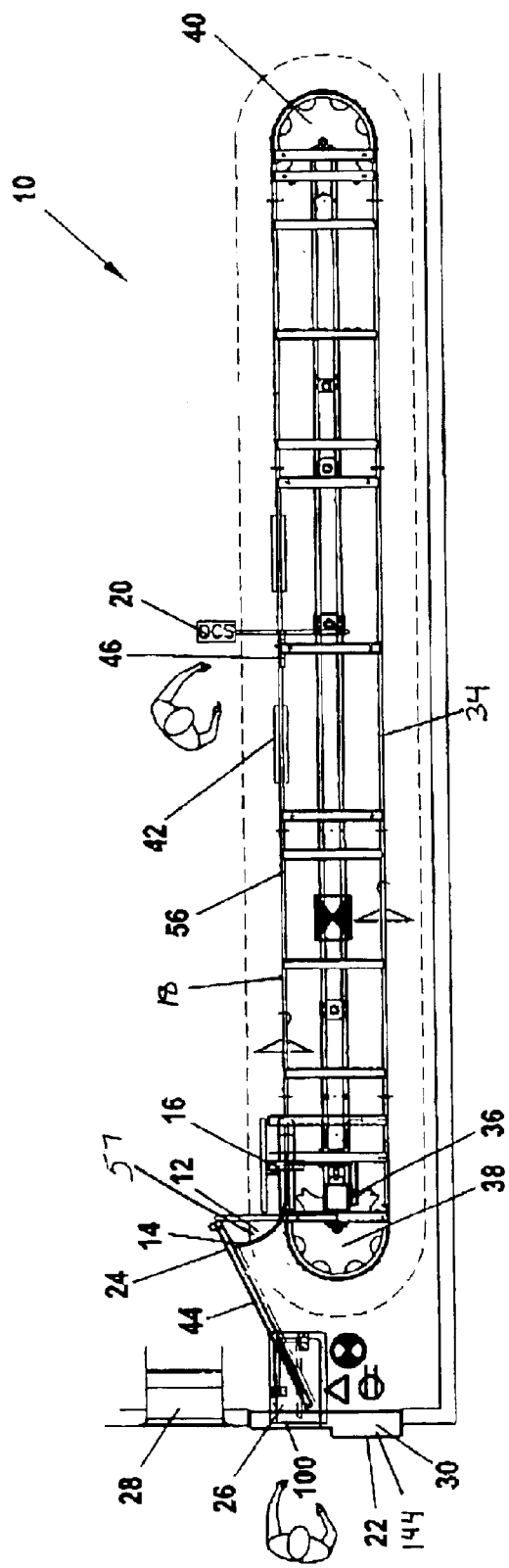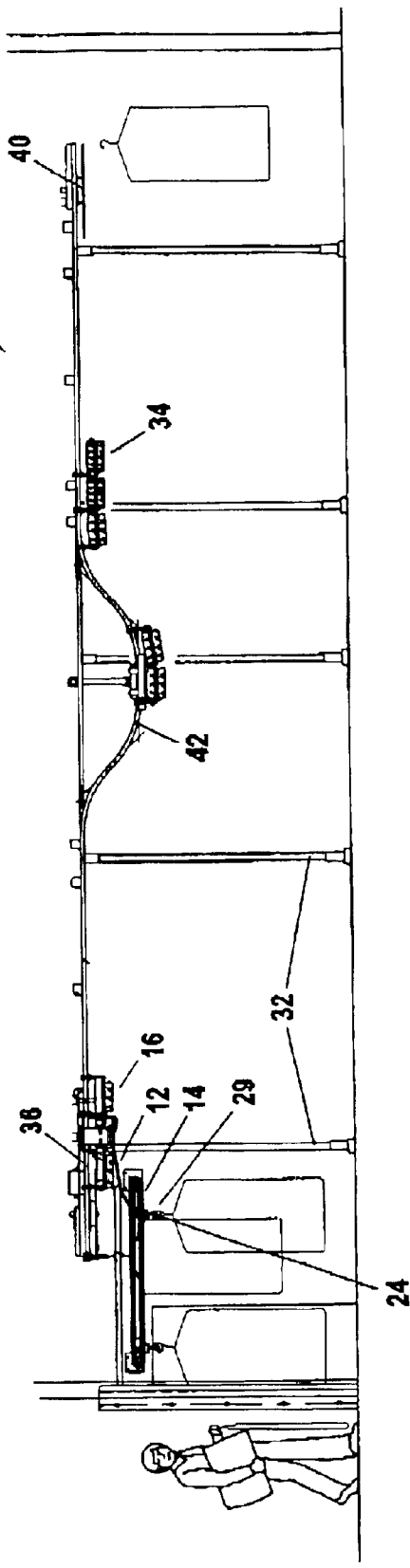
FIG. 2
FIG. 1

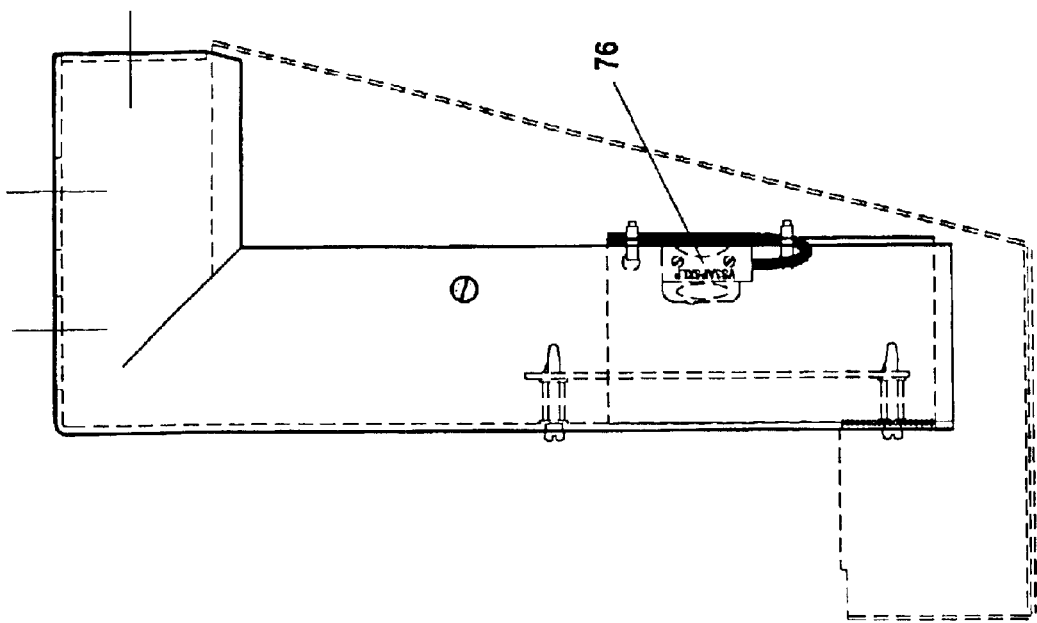
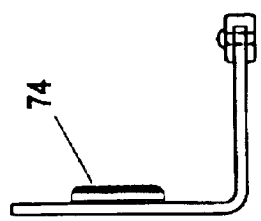
FIG. 17

MATERIAL HANDLING APPARATUS

FIELD OF THE INVENTION

The present invention relates to materials handling. More specifically, the present invention relates to an automated clothes handling apparatus and method that allows a user to make deposits of soiled clothing and withdrawals of dry cleaned clothes without a customer service attendant.

BACKGROUND INFORMATION

Dry cleaning services are becoming an increasingly important part of daily hygiene and personal property protection. With the introduction of new clothing fabrics and increasing demand for more fragile traditional fibers, such as silk, the need for dry cleaning services have increased over time. Dry cleaning provides many benefits for individuals who use such services. A prime benefit of dry cleaning is the ability to clean fibers that are unsuitable to be cleaned by traditional water washing. Dry cleaning also saves time. Individuals with soiled clothes merely have to drop off the soiled clothing at the dry cleaners and later pick up the cleaned clothes. As such, dry cleaning is extensively used by individuals who have busy schedules.

A further advantage of dry cleaning is the superior cleaning ability for "hard to remove" problem areas of soiled clothing. Dry cleaners, because they accumulate many items of clothing which are soiled in the same way, can be efficient in the care for such clothes. Soiled clothes may be segregated by clothing type or soiling conditions to assess, treat and care for the clothes. This ability to perform function repetitively results in efficiency for the operation.

Although there are many advantages for dry cleaning operations, several drawbacks limit the overall dry cleaning experience and usefulness. The first drawback is that in general, dry cleaning operations are only open during normal business hours. Dry cleaners must employ customer assistants to handle the clothes and obtain money from the customer. During off-peak hours, the customer assistants may have few customers, therefore resulting in a financial burden to the dry cleaning operation owner ultimately requiring shut down of the customer operations part of the facility for maximum financial efficiency. Busy individuals, however, often desire to use dry cleaning services at hours according to their schedules which do not correspond to dry cleaning open hours. As a result, certain potential customers are limited from using dry cleaning as they cannot attend the dry cleaners during the open hours.

A second drawback is long wait times for service at peak attendance hours. Often, people visit the dry cleaners at similar times, such as at lunch time or immediately following the end of a work day. The large number of customers and the relatively few customer service attendants results in long wait times negatively impacting customer service.

A third drawback is the cost of service for dry cleaning operations. Numerous people are employed, such as cashiers and customer service representatives, to help receive and dispense clothes. During non-peak times, little if any activity occurs from arriving customers. This inactivity results in financial inefficiency, which is ultimately passed to the customer. The cost of dry cleaning services consequently rises and some customers may be unable or unwilling to pay for dry cleaning services.

A fourth drawback for the dry cleaning industry is degradation of the product from multiple handling. After dry cleaning, the cleaned clothes are placed upon a rack system to maintain the clothes in a neat and wrinkle free configuration. When a customer attends the dry cleaners to pick up the cleaned clothes, an attendant pulls the clothes off a rack system and hands the clothes to the customer. The attendant, however well meaning or trained, may inadvertently wrinkle or disturb the cleaned clothes, thereby degrading the final product. The dense packing of the clothes on the rack coupled with the level of skill of the attendant directly impacts the final product and ultimately customer satisfaction.

A last drawback occurs during peak attendance hours. In processing dry cleaning orders, the attendants often receive compensation from the customer in the form of cash which must be changed by the attendant. The overall efficiency of the operation is limited by operations, such as change making, which have very little added benefit to the consumer.

There is a need to provide a dry cleaning service which will provide an efficient handling of clothes which is accessible to customers during more convenient hours.

There is a further need to supplement and/or replace current methods and apparatus to handle customer service operators during peak attendance times.

There is a still further need to increase overall efficiency of the dry cleaning industry and to limit overall costs stemming from inefficient use of personnel.

There is a need to increase product quality output by limiting unnecessary handling steps which may cause wrinkles or damage the overall product for the customer.

There is a further need to reduce inefficiency in the dry cleaning industry by limiting change making and encouraging efficient payment/compensation transactions.

SUMMARY

It is therefore an object of the present invention to provide a dry cleaning service which will provide an efficient service of handling of clothes which is accessible to customers during more convenient hours.

It is also an object of the present invention to supplement and/or replace current methods and apparatus to handle customer service operators during peak attendance times.

It is also an object of the present invention to increase overall efficiency of the dry cleaning industry and to limit overall costs stemming from inefficient use of personnel.

It is also an object of the present invention to increase product quality output by limiting unnecessary handling steps which may cause wrinkles or damage the overall product for the customer.

It is also an object of the present invention to reduce inefficiency in the dry cleaning industry by limiting change making and encouraging efficient payment/compensation transactions.

The objectives above are achieved as illustrated and described. The invention provides a material handling apparatus comprising a material delivery configuration with a first end and a second end, a transfer configuration connected to the first end of the material delivery configuration, a movable material handling arrangement configured to transfer at least one set of material on hangers supported by the arrangement to the material delivery configuration, a computer configured to control apparatus functions, a user interface configured to accept, process and provide data to a user, the user interface connected to the computer to transfer and receive data, a clearing arrangement configured to remove material from the transfer configuration, and an enclosure configured to separate the user from the movable material handling arrangement.

The invention also provides a method of moving material comprising, loading at least one set of material onto a movable material handling arrangement, inputting information into a computer for the at least one set of material, inputting information from a user interface, transferring the information from the user interface to the computer, processing the information from the at least one set of material and the user interface, indexing the movable material handling arrangement based upon the processed information, transferring material from the movable material handling arrangement to a material delivery configuration and transferring material from the material delivery configuration to a transfer configuration.

BRIEF DESCRIPTION OF THE DRAWINGS

FIG. 1 is a side view of a material handling apparatus in conformance with an embodiment of the invention.

FIG. 2 is a top view of the material handling apparatus of FIG. 1.

FIG. 17 is a side view of a photo-eye assembly.

DETAILED DESCRIPTION

Figure 3:
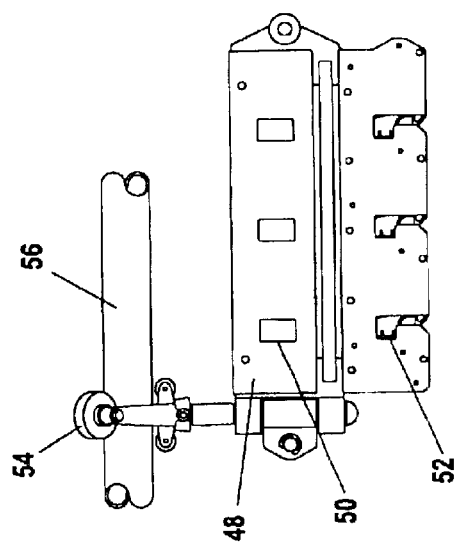
FIG. 3 is a side view of a 3-slot ADC chain for the material handling apparatus of FIG. 1.

As illustrated in FIGS. 1 and 2, a material handling apparatus 10 is provided that comprises a material delivery configuration 12 with a first end 14 and a second end 16. At the first end 14, a transfer configuration 44 is positioned to accept and transfer materials received from the material delivery configuration 12. A movable material handling arrangement 18 is positioned at the second end 16 of the material delivery configuration 12. The movable material handling arrangement 18 is configured to accept materials placed on the arrangement 18. The materials are loaded by an operator who transfers the materials onto the arrangement 18 and enters data about the materials onto a computer 20. Data may be entered by hand or by scanner allowing use of bar code technology. Data also may be entered by use of photonics and/or RF chips. Other configurations for loading materials onto the movable material handling arrangement 18 are possible, such as automatic loaders, and as such the embodiment illustrated is one example of the invention.

The movable-material handing arrangement 18 is configured with a sprocket 38 which is driven by a connected motor 36. The sprocket 38 may be made of any material such that the sprocket 38 may rotate an ADC chain 34, or other arrangement, which supports materials, such as dry cleaned clothes on hangers. The sprocket 38 may be configured from materials to allow the sprocket 38 to rotate the ADC chain 34 without damage to the materials of the sprocket 38. The materials may include, for example, stainless steel, carbon steel or other appropriate material. The sprocket 38 may be sized such that a desired speed of rotation of the apparatus is achieved. The sprocket 38 may additionally be configured with multiple or single prongs, thereby allowing greater or lesser contact between the sprocket 38 and the ADC chain 34 positioned on the apparatus 10.

A motor 36 provides the driving force for the sprocket 38. The motor 36 may be configured as a 120 hp unit, for example, and may be geared to an appropriate level to allow rotation of the sprocket 38, ADC chain 34 and supported materials. The motor 36 may be controlled by circuitry to allow multiple speed operation, including full and partial speed ability in both forward and reverser modes. The motor 36 may additionally be provided with a stop circuit such that in an emergency, the stop circuit may be activated, thereby allowing users to stop the apparatus 10 in an expedited manner. The motor 36 may additionally be controlled by a computer 20 to select positioning, speed and discharge functionality for the apparatus 10.

The material delivery configuration 12, as illustrated, provides a rail 57 which allows materials, such as clothes on hangers, to be transported from the movable material handling arrangement 18 to the transfer configuration 44. The material delivery configuration 12 provides a sliding surface which declines in elevation from the movable material handling arrangement 18 to the transfer configuration 44. The decline in elevation from the second end 16 to the first end 14 is chosen such that sliding is maintained throughout the length of the configuration 12 accounting for frictional force. The material delivery configuration 12 may be constructed from rugged material such as various metals, carbon steel or stainless steel to enhance corrosion resistance and may be a single or multiple piece unit. The material delivery configuration 12 may also be manufactured from aluminum or similar material to allow lightness of weight for the overall apparatus 10. The material delivery configuration 12 may be supported at the first end 14 by the transfer configuration 44 and the second end 16 to the attached movable material handling arrangement 18.

The movable-material handling arrangement 18, in addition to the sprocket 38 and the motor 36, provides a rail 56 upon which materials may be transported by the ADC chain 34 as an example. In the example embodiment illustrated, the rail 56 is sized such that the ADC chain 34 may be supported by the configuration of the combined rollers of the ADC chain 34 and the geometry of the rail 56. The rail 56 may be supported by supports 32 thereby allowing the rail 56 to be elevated from floor elevation. The rail 56 may be supported in a number of ways, such as cantilever supports or overhead supports, and as such, the example embodiment illustrated is but one embodiment of the invention. The supports 32 may be positioned such that the rail 56 is supported to limit bending, tension and other forces when loaded. In a typical embodiment, the rail 56 is supported by supports 32 at 4 foot center-line positions.

The rail 56 is configured with a v-dip section 42. The v-dip section 42 allows an operator to load materials such as clothes on hangers, on the rail 56 without excessive lifting height as measured from the floor elevation. The amount of dip in the v-dip section 42 may be specified according to the needs of the particular facility. The rail 56 may be modular in configuration such that individual sections may be added or removed, thereby allowing a longer or shorter overall rail length. Overall rail length may also be increased or decreased by changes in elevation apart from the v-dip section 42, allowing the apparatus 10 to effectively use minimum factory floor space, while providing maximum functionality.

At an end opposite of the sprocket 38, an idler 40 is positioned to provide a turning point for the supported ADC chain 34. The idler 40 may be configured as a simple sprocket or other arrangement to provide support during rotation of the ADC chain 34. Tension on the ADC chain 34 may be maintained through expanding or contracting the distance between the idler 40 and the sprocket 38 or may be maintained through a spring arrangement to allow for thermal or operational differences in chain length.

As further illustrated in FIGS. 1 and 2, a user interface 22 allows a user to access and input information to a computer 20. The computer 20 in turn, is programmed to control activities of the apparatus 10 to allow the user to accomplish desired functions. The user interface 22 allows a user to input information, such as a security code, through a key pad or a display. The display 22 may be either a monochrome or a full color display to allow the apparatus 10 to prompt and display information to the user and may be linked to the computer 20 for power supply and/or information transfer. The user interface 22 may be provided with a card reader to allow a card, such as a magnetic card, to be inserted to verify payment to be received. Although described as a magnetic card reader several types of cards may be accepted, input, read and processed by this configuration including credit cards, debit cards and prepayment cards. The user interface 22 may also be configured with a printer to provide receipts of completed transactions to the user. Different types of printers may be selected such as ink-jet, thermal and laser printers, depending upon the environmental conditions for the apparatus 10. Receipts may be discharged through a receipt dispensing arrangement 30. Multiple receipts may be provided when a user wishes to deposit materials into the material depository box 28. The receipt may be included with the deposited material, thereby allowing a correct identification of the user with the deposited material. The enclosure 26 may house the user interface, as an example, on one of two front panels, allowing for proper mounting. A selection pad 144 may also be configured to receive alpha numeric information from a user, to provide for quick selection of predetermined functions. Although illustrated as having a user interface 22 positioned on a front of the enclosure 26, other configurations are possible including a "stand alone" configuration, where the user interface 22 is set apart from other components of the apparatus 10.

The computer 20 allows for storage and retrieval of information, as well as controlling apparatus functions. The computer 20 may be configured with a connection to the internet to allow remote access of information by qualified users. The computer 20 may be configured to allow users to be notified remotely that materials handled by the apparatus 10 are ready to be dispensed. The computer 20 is programed such that when a user activates the user interface 22, the computer 20 prompts the user for a security code. After inputting the security code, the computer 20 is then programed to provide a menu list of activities such as a deposit of materials or pick-up of materials from the apparatus 10. The user enters the desired information and the computer 20 processes the request. Based upon the processed information, the computer 20 is programmed to activate the apparatus 10 differently in a pick-up mode versus a deposit mode. In a pick-up mode, the computer allows the movable material handling arrangement 18 to position materials, into a configuration such that the materials may be discharged from the movable material handling arrangement 18 and onto the material delivery configuration 12. The materials are then transferred to the transfer configuration 44 which is controlled by the computer 20 with input from the proximity sensors 90, on the transfer configuration 44 illustrated on FIG. 11. In a deposit mode, the computer 20 allows a material depository box 28 to be unlocked through activation of a configuration 140, such as a solenoid. Upon a successful deposit of materials, the computer 20 is configured to close the configuration 140, as illustrated on FIG. 6, to prevent unauthorized deposits into the box 28. The computer 20 is also equipped to monitor the components of the apparatus 10 to indicate fault conditions, provide maintenance diagnostic tools for repair operations and status of load for the apparatus 10. A loading mode may be designated on the computer 20 to allow materials to be placed on the apparatus 10 in an efficient manner and to prevent unauthorized movement of the apparatus 10, increasing worker safety in the apparatus area. The computer 20 may also be programmed to interact with a central station computer to provide information about local customer needs and number of uses of the apparatus 10 over time. The computer 20 may also provide for checking of payment i.e. credit card validation, providing a quick and efficient method for payment.

The transfer configuration 44 extends from the material delivery configuration 12 through to an enclosure 26. The enclosure 26 provides separation from an outside environment to an inside environment. The enclosure 26 may be provided with a movable translucent door 100, as an example, to allow a user to identify materials inside the enclosure 26.

As illustrated in FIG. 3, a 3 slot ADC chain link 48 may be used to support materials on the movable material handling arrangement 18. The 3 slot ADC chain link 48 provides an engagement configuration 52 to allow materials to be held by the chain 48. The engagement configuration 52 may be constructed out of metal, other material, or combination of materials which would allow support of hanging materials from the apparatus 10. Slots 50 positioned on the 3 slot ADC chain link 48 allow for identification of material position along the movable material handling arrangement 18. The slots 50 are provided with a configuration to allow a light beam to traverse the body of the chain 48 through the slot 50. The slots 50 may be widened or narrowed according to the desired speed of the chain 48, wherein wider slots 50 will allow a longer read time for a photo-eye 76, as illustrated in FIG. 17, thereby allowing a faster chain speed. In a typical embodiment, the chain 48 may undergo 1600 revolutions in a business day. Other speeds may be selected based upon frequency of use and storage capacity of the movable material handling arrangement 18.

Figure 4:
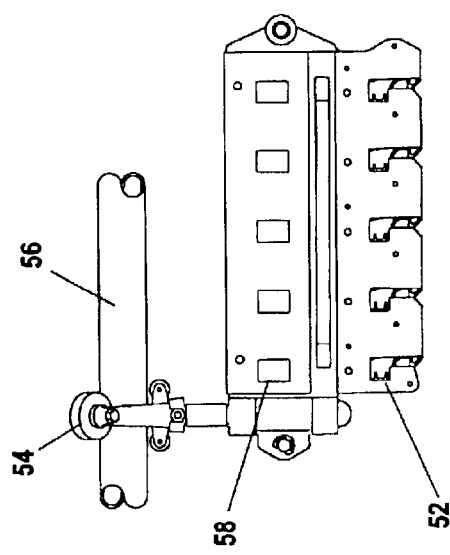
FIG. 4 is a side view of a 5-slot ADC chain for the material handling apparatus of FIG. 1.

As illustrated in FIG. 4, a 5-slot ADC chain link 58 provides an engagement configuration 52 which allows material to be held through 5 individual locations. Similar to the 3-slot ADC chain 48, the 5-slot ADC chain 58 is supported through rollers 54 which contact a rail 56. Both the 3-slot ADC chain 48 and the 5 slot ADC chain 58 members may be used singularly or in combination to support materials as part of the ADC chain 34 of FIG. 1.

The 5 slot ADC chain 58 provides 5 individual slots to allow a light beam to pass through the chain 58 to allow for determining of material position. The monitoring of position of both the 5-slot 58 and 3-slot 48 ADC chain links allows for proper indexing of material on the apparatus 10, wherein the photo-eye 76 provides data to the computer 20 allowing tracking of materials as they progress before the photo-eye 76. Although the chain links 48, 58 are illustrated as configured with a cantilever support, other configurations are possible including multiple or redundant supports from the rail 56. The spacing between chain link members 48, 58 of the chain 34 should be maintained such that changes in elevation do not cause binding between individual link members.

Figure 5:
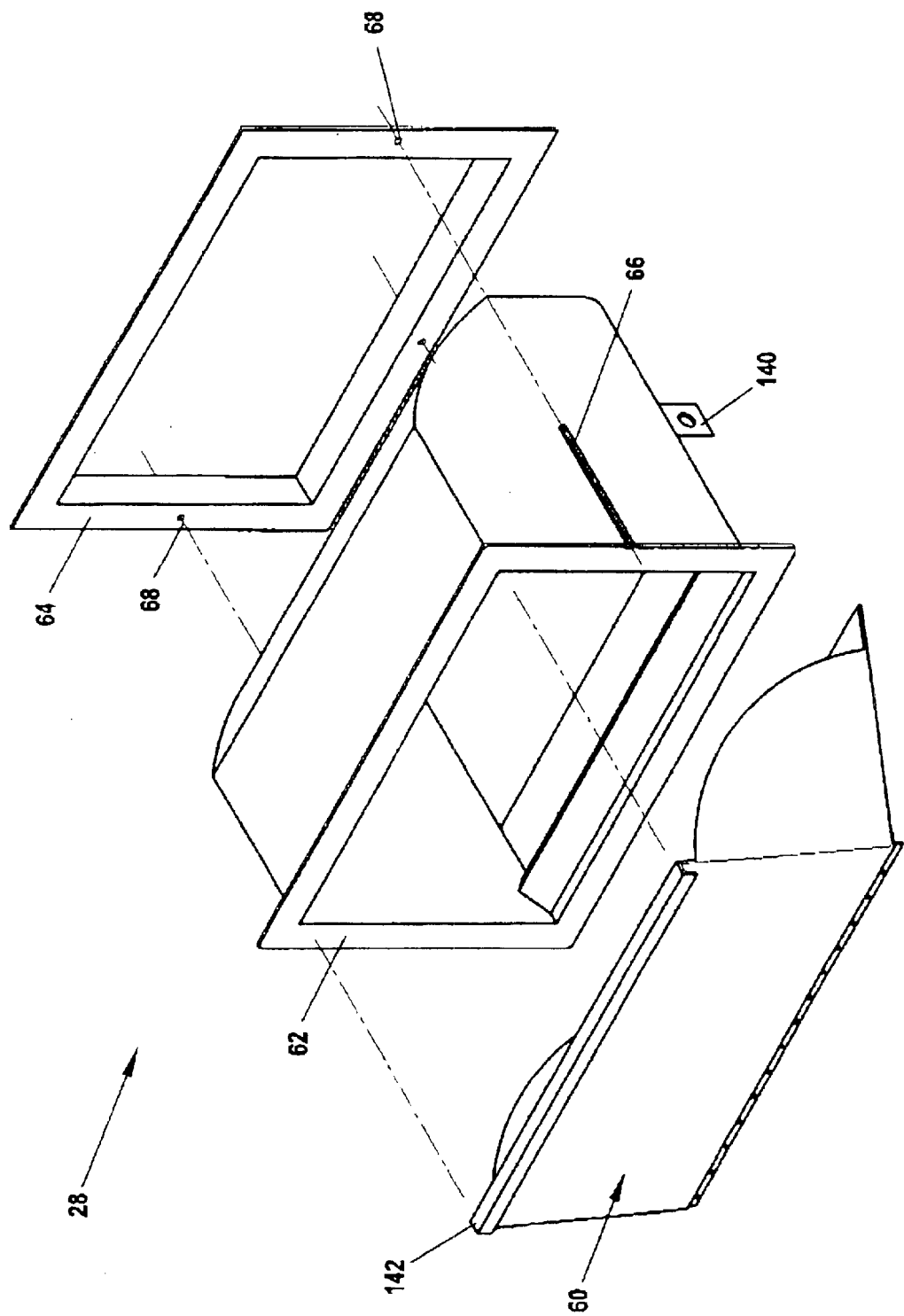
FIG. 5 is a perspective view of a material depository box of FIG. 1.
Figure 6:
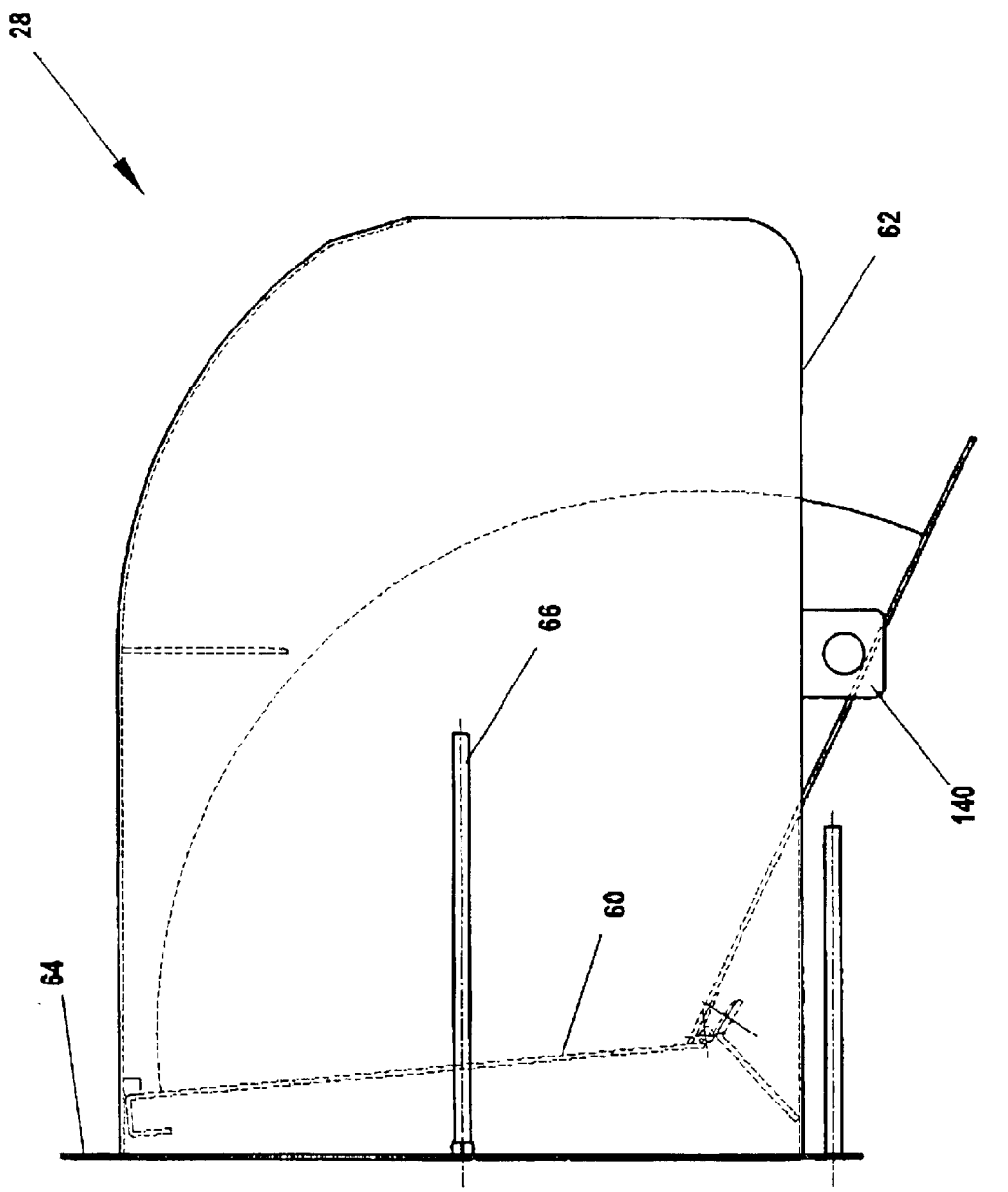
FIG. 6 is a side view of the material depository box of FIG. 5.

As illustrated in FIGS. 5 and 6, a material depository box 28 provides for insertion of material, such as, for example, soiled laundry, into the apparatus 10 for processing. The material depository box 28 is comprised of a front drawer 60, a housing 62, a frame 64, two threaded rods 66 and a configuration 140. The front drawer 60 provides a configuration to open the box 28 with the built-in handle 142. The material depository box 28 is attached to a surface through use of the housing 62 attached by the threaded rods 66. Matching holes 68 in the frame 64 provides for penetration of the threaded rods 66 through the frame 64 to the surface, such as for example a brick wall. Although illustrated as threaded rods, other materials may be used including standard bolts, screws or other attachment arrangements. The housing 62 fits into the interior of the frame 64 such that the housing 62 is adequately supported. The material depository box 28, in a closed configuration, may be weather-resistant to prevent weather elements such as rain and/or snow from entering the apparatus 10. The box 28 may be constructed from a variety of materials providing both the weather resistant enclosure coupled with structural strength, limiting potential break-in by unauthorized personnel. The box 28, as an example, may be made from stainless steel, aluminum, carbon steel or other material.

Figure 7:
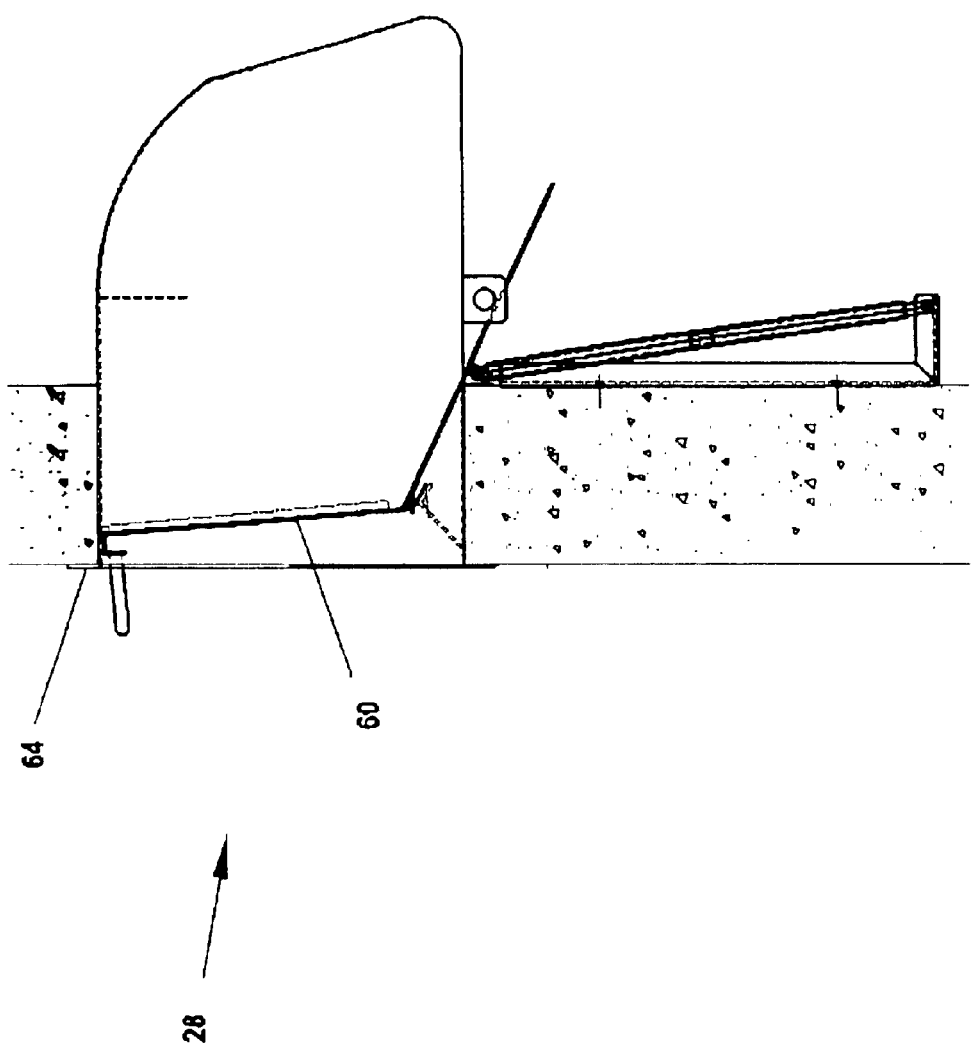
FIG. 7 is a side view of a typical mounting of the material depository box of FIG. 5.

FIG. 6 illustrates a side view of the material depository box 28 in an assembled configuration. FIG. 7 illustrates the assembled configuration of FIG. 6, is installed on an a surface.

Figure 8:
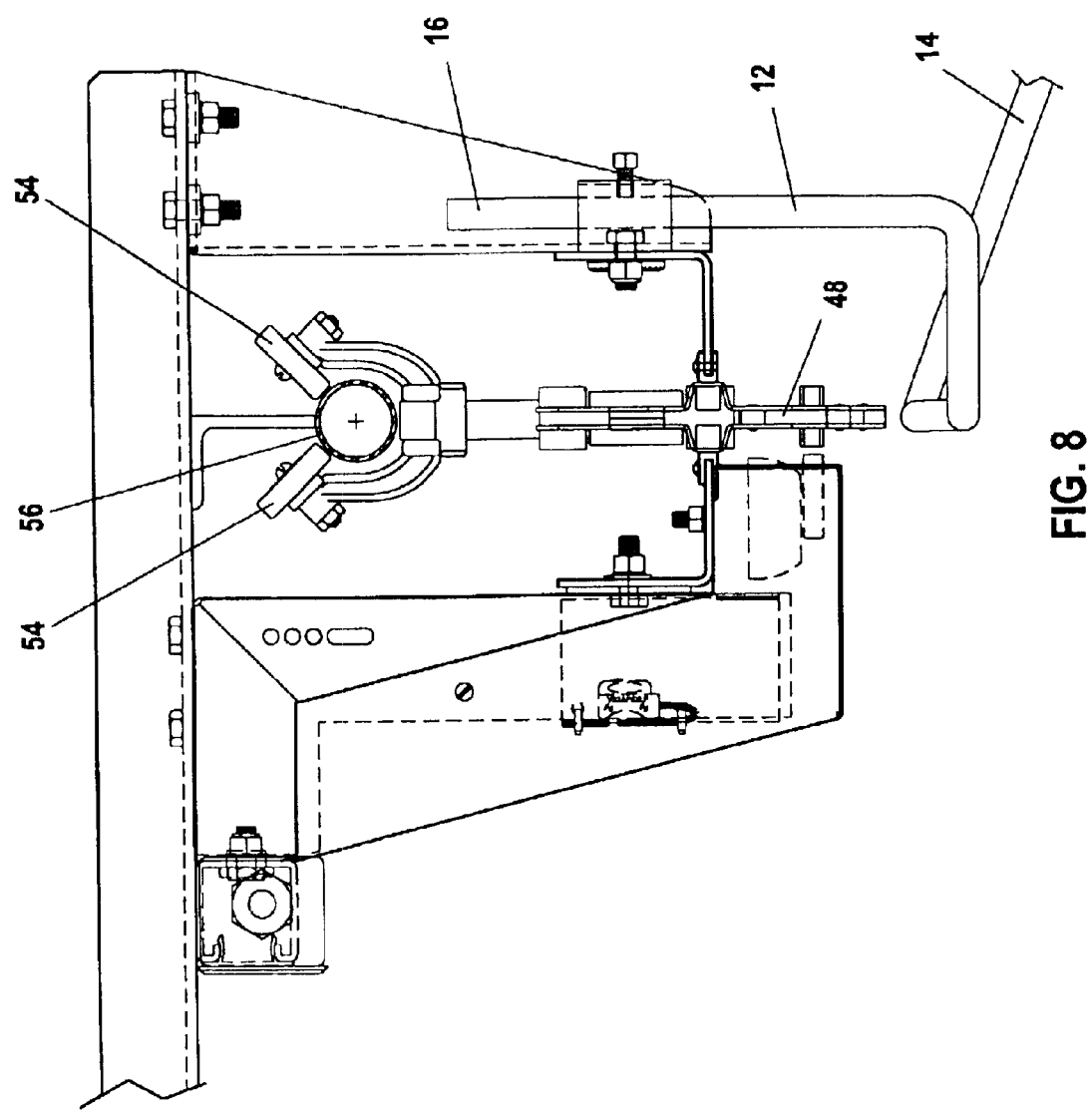
FIG. 8 is a cross-sectional view of the rail configuration of FIGS. 1 and 2.
Figure 9:
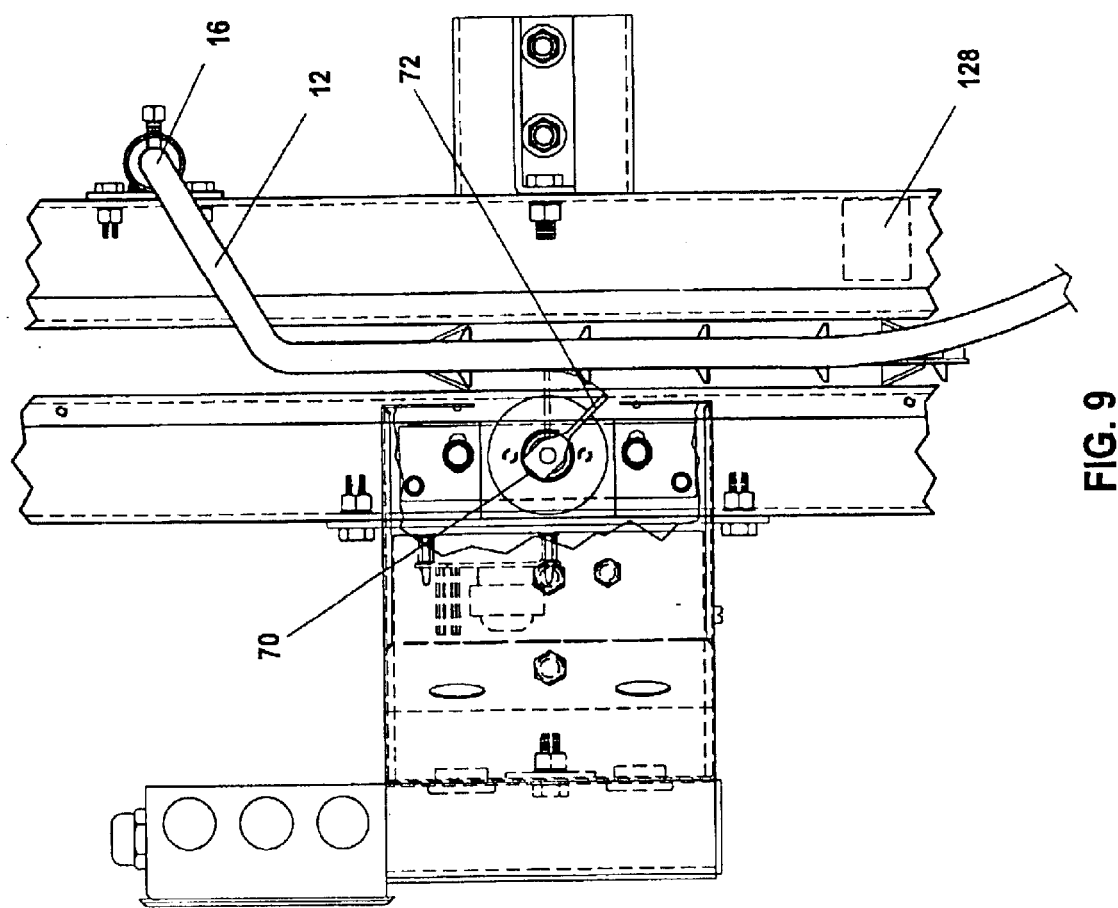
FIG. 9 is a bottom view of the station assembly of FIG. 8.

FIGS. 8 and 9 illustrate partial views the movable material handling arrangement 18 and configuration 12. Rollers 54 ride on a rail 56 which support the ADC chain 34. In the embodiment illustrated, the rail 56 is supported from a top position. The rail 56 may be configured from stainless steel pipe stock as an example with a 1 inch nominal external diameter. The material delivery configuration 12 is positioned to receive material provided by the chain 34. The second end 16 of the configuration 12 allows placement of the configuration 12 underneath the rail 56 to allow for smooth transfer of material to the configuration 12. As illustrated, the first end 14 of the configuration 12 is lower in elevation than the second end 16 such that material may slide along the configuration 12 from the second end 16 to the first end 14. The configuration 12 may be attached to a support 32 through a bolted arrangement as illustrated, or through other appropriate connections such as welding. The configuration 12 may be made from pipe stock or similar material to allow the materials placed on the configuration 12 to transfer along the length of the unit. Materials may be removed from the chain 34 by a paddle 72 solenoid 70 configuration. The paddle 72 connected to a solenoid 70 may be activated by the computer 20 to selectively dispense material from the movable material handling arrangement 18 to the material delivery configuration 12 based upon material position, and user/operator input. The solenoid 70 and paddle 72 may be configured such that rotation of the paddle 72 allows for contact between the paddle 72 and the material supported from the ADC chain 34 wherein the material is dislodged from the chain 34, consequently falling onto the material delivery configuration 12. Although illustrated as a paddle 72, other configurations are possible such as a pushing arrangement, a pulling arrangement or other similar configuration. The paddle 72 may be manufactured from a shear resistant material to allow for dislodgement without detrimental effect on the paddle 72. The paddle 72 may be a partial movement unit as illustrated or may be a full rotation unit. If a partial movement unit, the paddle 72 may be returned by the solenoid 70 or may be returned through another configuration such as a spring arrangement. The paddle 72 and solenoid 70 may be supported in any arrangement as long as the paddle 72 has sufficient contact surface to strike and dislodge the material from the chain 34.

A CCD camera 128 supported from the arrangement 18, as an example, may be positioned in the vicinity of the rail 56 to read bar code information on the chain 34 or materials to aid in object positioning. The CCD camera 128 may be connected to the computer 20 to allow for activation of the camera 128 as well as data transport between the camera 128 and the computer 20. The CCD camera 128 may include laser technology and/or rotary element arrangements to increase the field of scanning capabilities.

Figure 10:
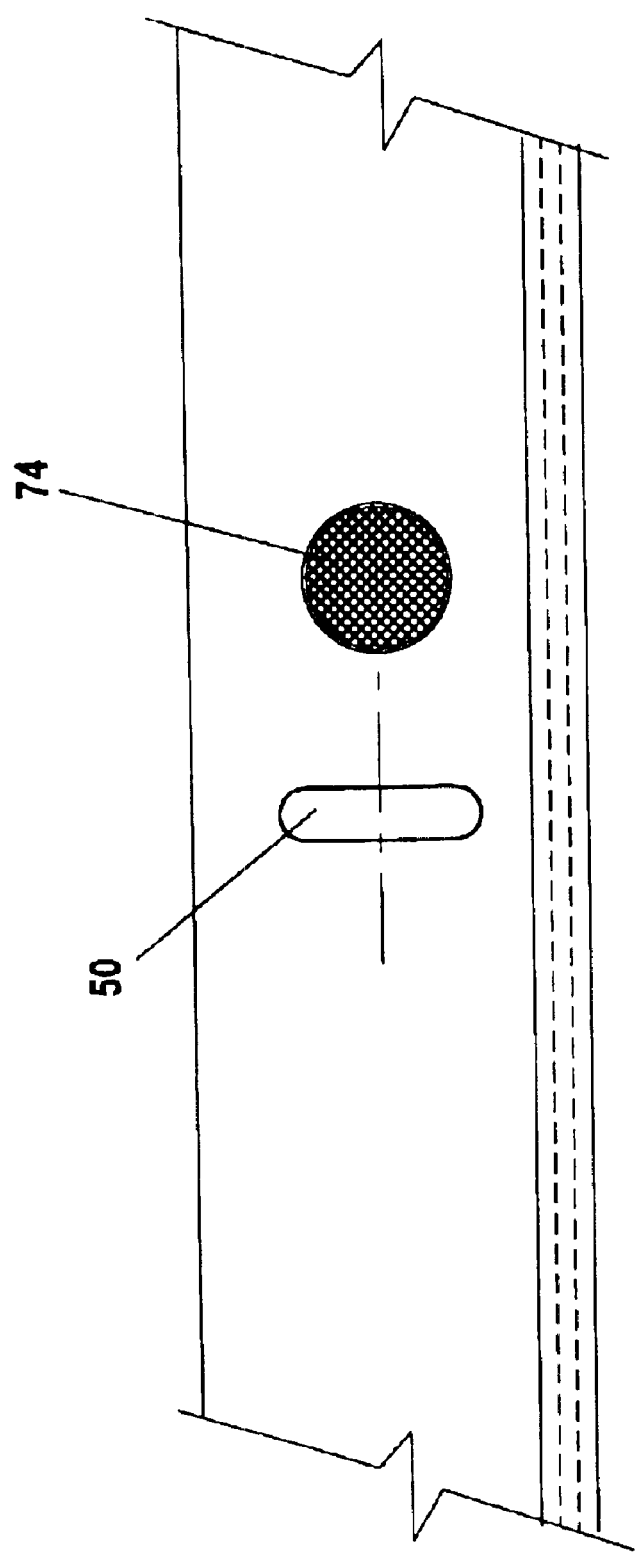
FIG. 10 is a side view of a photo-eye reflector of the material handling apparatus of FIG. 1.

As illustrated in FIG. 10, a photo-eye reflector 74 supported from the arrangement 18, as an example, provides for reflection of energy produced by a photo-eye 76 illustrated in FIG. 17. The photo-eye reflector 74 provides a surface which will reflect light, as generated by a photo-eye 76 to allow for ascertainment of material position on the apparatus 10. The photo-eye reflector 74 may be placed on any structure such that the reflector 74 allows light waves to travel through slots 50 located on the ADC chain 34. The reflector 74 may be constructed of material such that, for example, little dispersion of light occurs and an object beam striking the reflector 74 is returned to the source of the light.

FIG. 17 illustrates a photo-eye 76 in relative position to the reflector 74 of FIG. 10. The photo-eye 76 may be any such unit that delivers a beam of energy, in the example illustrated a beam of light, to the reflector 74. The photo-eye 76 may also be configured to detect the reflected beam. The photo-eye 76 may be connected to a power source to allow for activation of the photo-eye 76 to produce the beam. The photo-eye 76 may also be configured such that it is controlled through the computer 20 to time the apparatus 10. This provides exact positioning of material throughout the apparatus 10 for material indexing. The photo-eye 76 may be attached to a support to allow for fine positioning of the photo-eye 76 thereby providing an incidence beam which may be reflected back to the photo-eye 76 by the reflector 74. The reflector 74, in turn, may also be adjustable to allow the beam to be reflected back to the source, the photo-eye 76. The photo-eye 76 may be positioned in a self-contained unit thereby preventing unwanted grease and/or dust from impacting the operation of the photo-eye 76. The photo-eye 76 may also be positioned in a stand-alone configuration to allow for quick change-out to maximize maintenance efficiency in the event of component breakdown.

Figure 11:
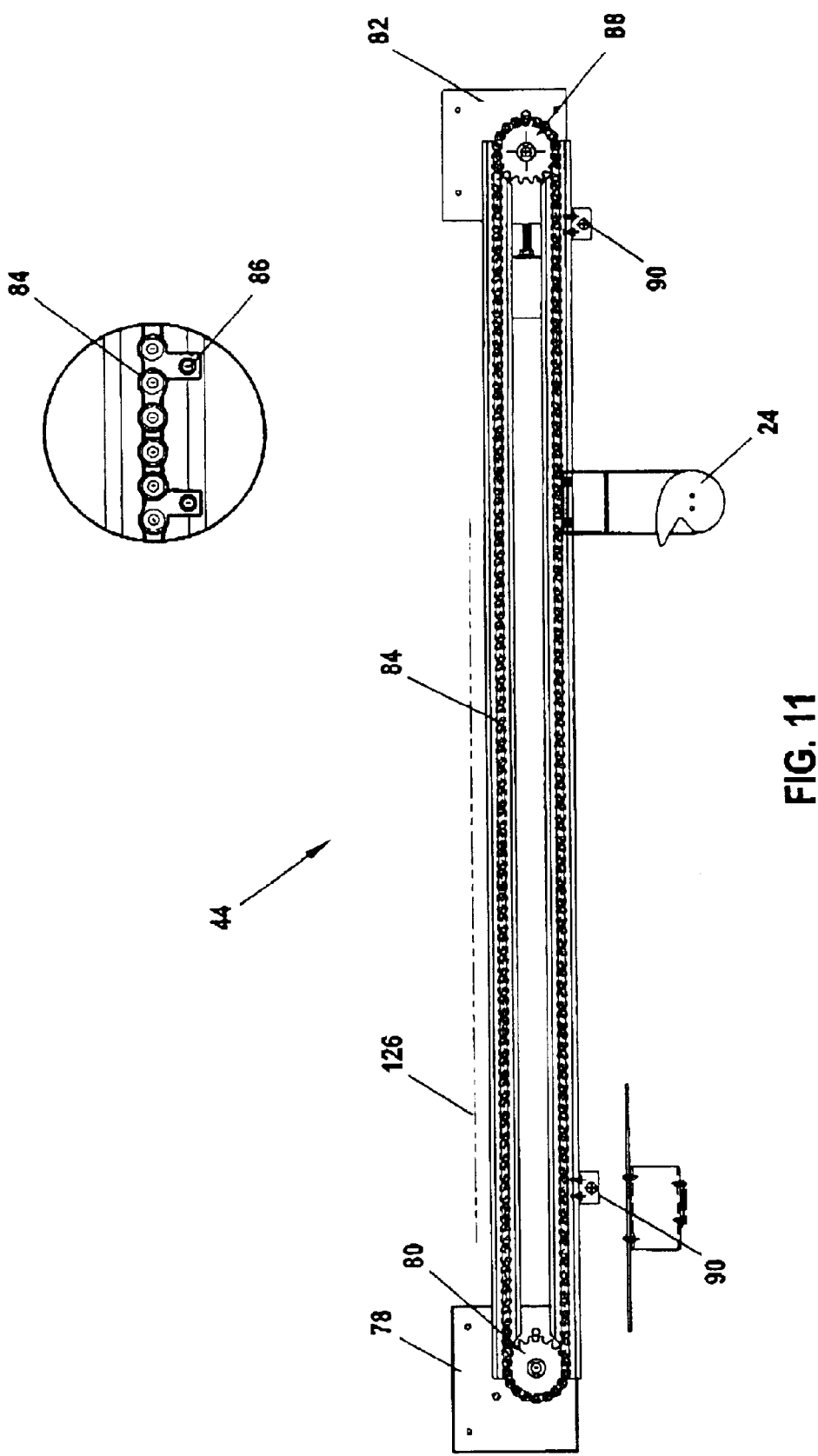
FIG. 11 is a front view of a drive arrangement of a transfer configuration.

FIG. 11 illustrates a front view of a transfer configuration 44. The transfer configuration 44 is comprised of a drive assembly 78 which has an attached drive sprocket 80 as an example. The drive assembly 78 may be driven by a separate motor or through gear reduction from the motor 36 of the movable material handling arrangement 18 shown in FIG. 1. The sprocket 80 may be configured such that the outer radius of the sprocket 80 is larger or smaller depending upon the speed of travel desired for the transfer configuration 44. The sprocket 80 may be fashioned as a separate unit placed upon a traveling slot arrangement to allow for easy maintenance and reduction of slack in the chain 84. An idler take-up assembly 82 is positioned to support the chain 84 and to remove additional slack from the chain 84. The idler take-up assembly 82 may provide a turning point for the chain 84, thereby allowing both forward and reverse direction of travel along the transfer configuration 44. An idler sprocket 88 of the idler take-up assembly 82 may be configured similarly to the sprocket 80 of the drive assembly 78 to allow for movement of the chain 84. Proximity sensors 90 are positioned along the chain 84 to enable the material handling apparatus 10 to ascertain the maximum travel limitations of the chain 84. The proximity sensors 90 may be connected to the computer 20 to limit the travel of the chain 84 along the configuration 44 and therefore command the transfer configuration 44 to appropriate operational limits through control of the computer 20. The proximity sensors 90 may be configured to detect metallic objects, as an example, within a predetermined range. As a consequence, the sensors 90 may be configured to provide a signal to the computer 20 when a sensor 90 comes in close proximity to a metallic object, such as the drive arrangement 78 or idler take-up assembly 82. When the sensor 90 comes into close proximity to an metallic object, such as the drive arrangement 78 or idler take-up assembly 82, the signal provided to the computer 20 allows the computer 20 to limit or stop movement of the chain 84 to prevent excessive rotation. As illustrated, the chain 84 is a standard metal roller chain which allows easy maintenance, however other configurations are possible such as pulleys and cables. The chain 84 may optionally have a guard 126 to protect the chain 84 from obstruction and foreign material. Tabs 86 arranged on the chain 84 may directly or indirectly support material on the chain 84 as it is carried along the chain travel path. As illustrated, the tabs 86 provide the structural support for items, such as clothes hangers or may support a structure, such as a connecting rod, which may support the materials.

A clearing arrangement 24 provides a mechanism whereby material on the transfer configuration 44 may be removed from the transfer configuration 44. The clearing arrangement 24 may provide, as an example, a cam with an eccentric lobe to remove material from the transfer configuration 44 when operated in a specific direction. In the embodiment illustrated, the material may be removed by running the transfer configuration 44 in a direction towards the movable material handling arrangement 18. The clearing arrangement 24 may be connected to the rail 56, a support 32 or other arrangement to allow for clear support. Activation of the clearing arrangement 24 may be through the computer 20 or other arrangement.

As illustrated in FIG. 11, the clearing arrangement 24, may be configured as an arrangement such that objects striking the smooth lobed section of the arrangement are not removed from the support provided by the chain 84. In a reverse chain direction, however, objects supported from the chain 84 strike the non-rounded section of the arrangement and therefore are provided with a resistance to movement. The non-rounded section of the arrangement 24 thereby causes dislodgement of objects supported by the chain 84.

Objects or materials removed from the chain 84 may be placed in a hamper, as an example, or may be transferred to a separate conveyor system away from the arrangement 24. Although illustrated as a cam type arrangement, other configurations are possible with the example embodiment illustrated just one of possible configurations. The arrangement 24 may be configured from metal to provide adequate impact resistance during movement of materials along the chain travel route.

Figure 12:
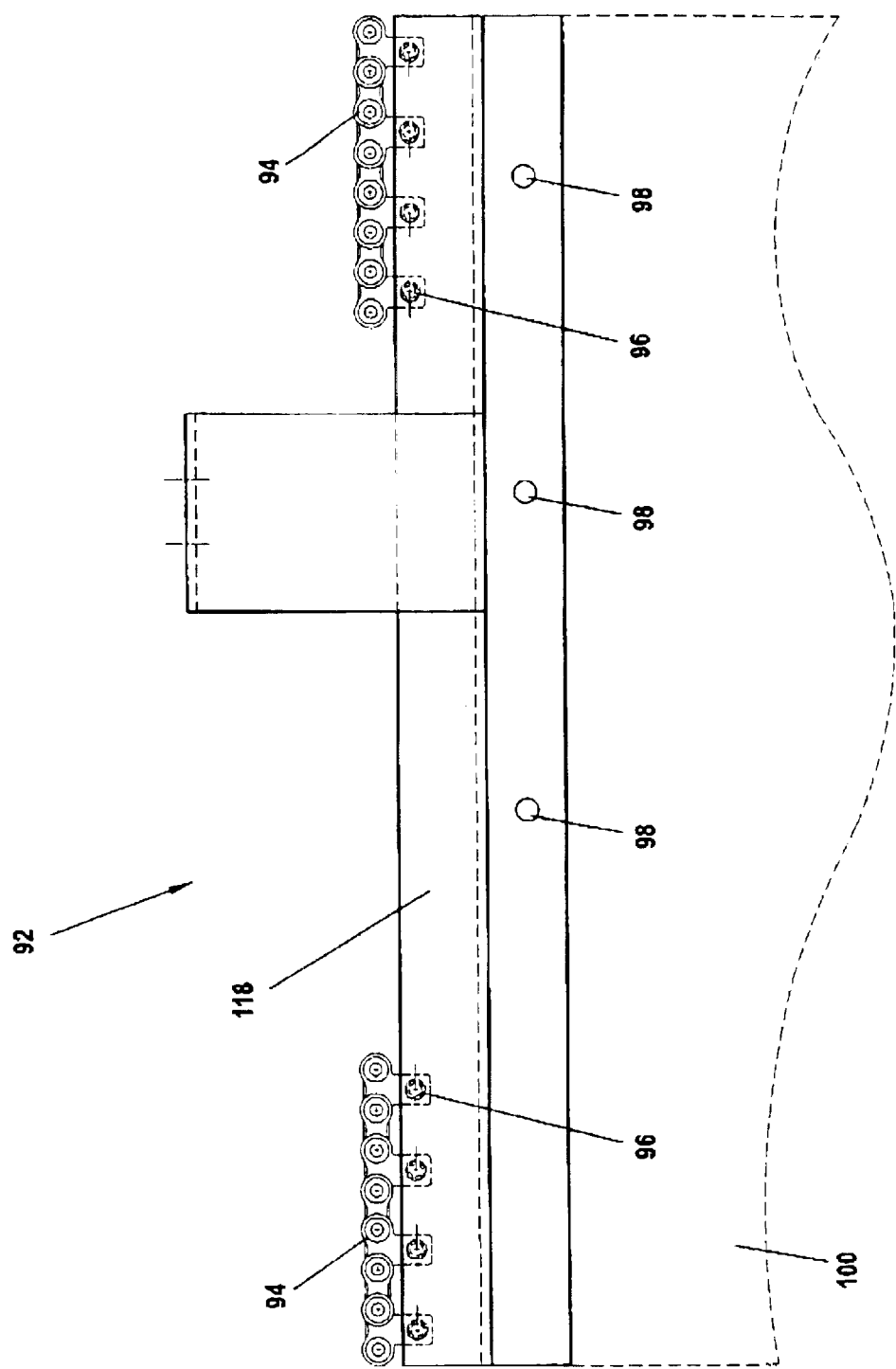
FIG. 12 is a side view of a roller arrangement of a sliding door.

FIG. 12 illustrates a side view of a door assembly holder 92 for a sliding door 100 for the enclosure 26 illustrated in FIG. 1. In FIG. 12 the holder 92 is comprised of rollers 94 which are attached to a member 118. The attachment of the rollers 94 to the member 118 is through a connection 96 which may be, for example, a bolted or welded connection. The member 118 is also configured with attachment points 98 which allow connection of the door 100 to the door assembly holder 92. The door assembly holder 92 may attach to the door 100 through pressure fittings or through door connection points. The door assembly holder 92 may support the door 100 in a vertical position from a top or a bottom placement.

Figure 13:
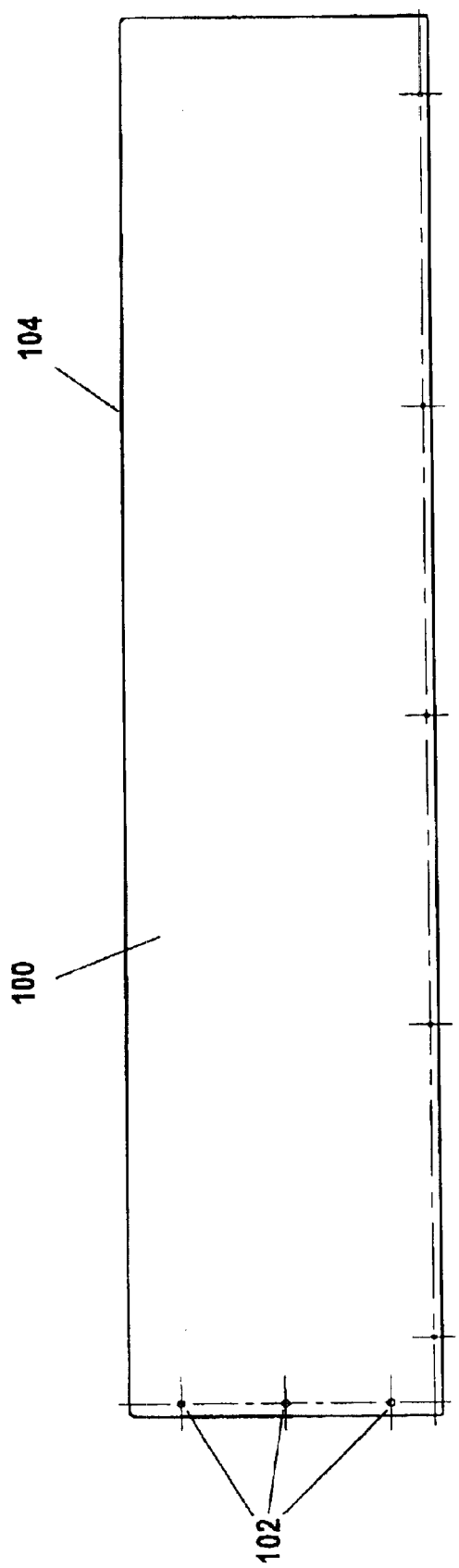
FIG. 13 is a side view of a door for the enclosure of FIG. 1.

FIG. 13 is a front door detail of the present invention which attached to the door assembly holder 92 of FIG. 12. The door 100 is placed as part of the enclosure 26. The door 100 may be any shape as desired including the rectangular shape illustrated. The door 100 may be configured with holes 102 which may be used to aid in holding the door 100. The door 100 may be configured with a leading edge 104 which may be rounded to prevent a pinch point from occurring when the door 100 is closed. Both the edge 104 and corners may be rounded increasing safety of the apparatus 10 by eliminating sharp pinch points. The door 100 may be manufactured of light-weight material to allow the door 100 to be opened by a small motor or manually if desired. The door 100 may additionally be manufactured from plastic or a transparent material thereby allowing a user to identify the presence of objects placed behind the door 100 when in a closed position. The door 100 may still further be configured from impact resistant material to prevent shattering of the door 100 upon accident or intentional impact. The spacing of the holes 102 may be chosen such that upon an impact the connections between the door 100 and the door assembly holder 92 allow proper load transfer to the enclosure 26 without resulting in breakage of the door 100 and/or the enclosure 26. In a closed position, the door 100 may be configured to be weather-resistant separating an outside environment from an inside environment.

Figure 16:
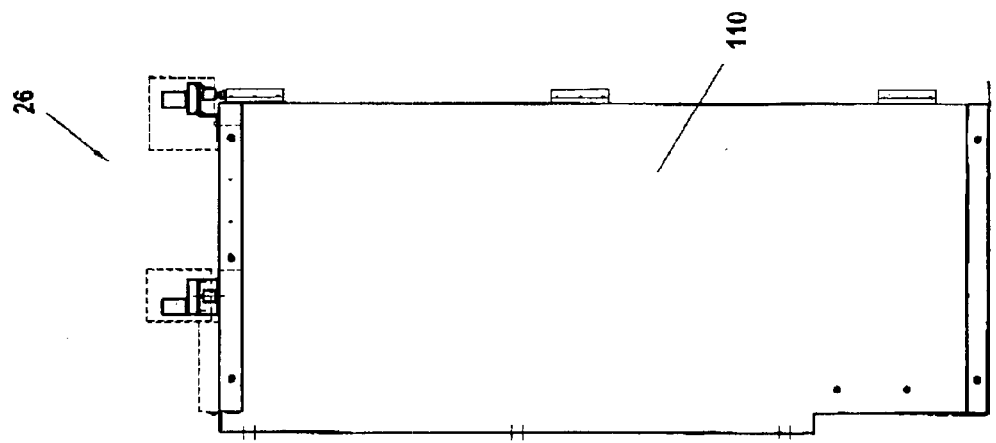
FIG. 16 is a right side view of the enclosure of FIG. 1.
Figure 14:
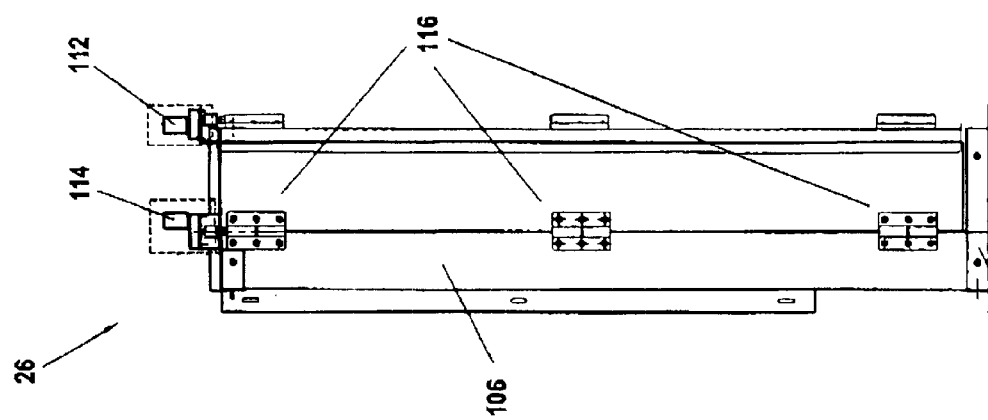
FIG. 14 is a back view of the enclosure of FIG. 1.
Figure 15:
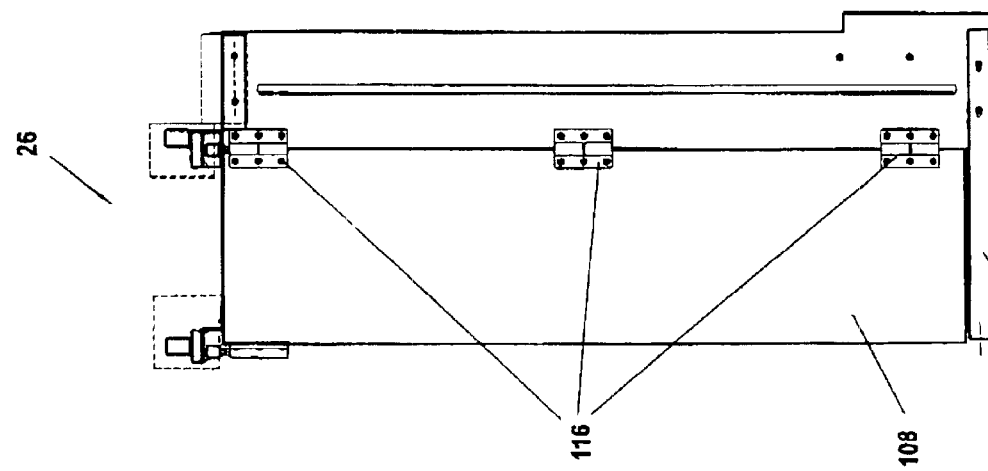
FIG. 15 is a left side view of the enclosure of FIG. 1.

Referring to FIGS. 14, 15 and 16, a section of the enclosure 26 for the apparatus 10 is illustrated. The enclosure 26 may be configured with a first motor 112 and a second motor 14. The enclosure 26 is provided to accept and house materials provided by the transfer configuration 44. The enclosure 26 has a further capability of providing a weather-resistant capability for the apparatus 10 to allow separation of an outside environment to an inside environment. In the configuration illustrated, the two motors 112, 114 allow for separation of the component parts of the enclosure 26 thereby allowing insertion of the materials into a volume defined by the enclosure 26. Referring to FIG. 14, a set of hinges 116 allows an enclosure back 106 to move relative to an enclosure left section 108 upon activation of the second motor 114. Referring to FIG. 15, the enclosure left section 108 provides a second part of a mating enclosure to enable the left section 108 to be moved relative to the enclosure back 106. The enclosure left section 108 is moved through activation of the first motor 112. Both the first motor 112 and the second motor 114 may be gear motors with 25 rpm direct current drive, for example. The motors 112, 114 may be geared to open and/or close the enclosure sections at a desired rate. The motors 112, 114 may be connected to the computer 20 to allow activation of the enclosure 26 in an opening or closing mode when materials are being transported along the transfer configuration 44. The enclosure 26 illustrated provides for movement between the back 106 and left 108 sections. Movement of the right side 110 of the enclosure may be accomplished in a similar fashion and as such the embodiment illustrated is but a single embodiment of the invention.

The enclosure 26 may be configured with a ventilation system for additional safety in the event of an animal or small child entering the enclosure 26, eliminating suffocating concerns. The enclosure 26 may additionally be configured with a water deluge system in case of fire generated or contained within the enclosure 26.

An enclosure bottom 120 may be configured with a sensor and/or a weight analyzer to allow the apparatus 10 to determine if an object has been placed in the enclosure 26. Through the use of the bottom 120, safety of the apparatus 10 may be increased allowing identification of unauthorized materials placed inside the apparatus 10. The enclosure 26 may additionally be configured with a light source to allow easy identification of objects in the enclosure 26.

Operationally, a user accesses a front panel of the apparatus. The user activates the user interface 22, in this embodiment a touch screen. The touch screen prompts the user if the user is already registered as a valid user of the system. The user identifies his/herself using an identification code and then entering a security code to allow further activation of the apparatus 10. The user interface 22 then prompts the user for the functions desired. In this embodiment, the user may choose from depositing soiled clothing in the material depository box 28, picking up cleaned clothes, or any combination of these alternatives. In the present example, the user identifies that two functions are desired, that soiled clothes are to be deposited in the material depository box 28 and clean clothes will be picked up. The apparatus 10 scans the user database on the computer 20 and accesses available data such as number of garments loaded in the apparatus, user name, address, and preferred payment type and number of clothes to be deposited. Based on data either accessed or input by the user, two receipt tickets are printed, one to be included in with the soiled clothes and one to be kept by the user after completion of activities. A bag is dispensed by the apparatus 10 through the enclosure 26 by the transfer configuration 44. The user then places the clothes in the bag. The user additionally places one of the printed receipts in or on the bag to identify the proper owner of the clothes. Alternative arrangements may be used for dispersing bags such as a bag dispenser. The bags dispensed may be bar coded or may have a receipt automatically dispensed into the bag. After the apparatus 10 verifies the security code and identifies that soiled clothes are to be dropped off, the material depository box 28 is unlocked through configuration 140 activation. The user then opens the material depository box 28 and places the soiled clothes encapsulated in the bag, with the receipt in the box 28. After receiving a confirmation that drop-off is complete, the apparatus 10 re-engages the configuration 140 on the depository box 28 again locking the box 28.

The user is then prompted to wait while the cleaned clothes are provided. The user interface 22 then requests payment from the user through the card reader. The user places a credit card in the user interface 22 and the card is read and verified by the computer 20 for accuracy. After successful verification, the computer 20 accesses a database to determine the number of garments that are currently on the material handling apparatus 10 that will be retrieved. In the present example, three individual dry cleaned clothes are desired to be discharged to the user. The computer 20 identifies the individual positions of clothes positioned in the movable handling arrangement 18 belonging to the user. The computer 20 then places the material handling arrangement 18 into a pick-up mode. The motor 36 is activated by the computer 20 to rotate the movable material handling arrangement 18. The clothes travel around the arrangement 18 on the ADC chain 34 which are unlatched by computer activation of the solenoid 70 to paddle 72 arrangement. The clothes reach a dispensing position where the latches are individually triggered allowing the clothes to be vertically dropped from the arrangement 18 onto a material delivery configuration 12, in the present example embodiment, a vertically declining rail. The dropped clothes decline along material deliver configuration 12 to the transfer configuration 44. The transfer configuration 44 is activated by the computer 20 such that the dropped clothes are transported along the configuration 44. The enclosure back 106 is opened allowing the clothes to be slipped through the back of the enclosure 26 along the configuration 44 to a position such that a user may access the clothes. A translucent door 100 is then activated in the enclosure 26 such that the door 100 is rolled to an open position. In the open position the user may then retrieve the clothes provided by the apparatus 10. A sensor 128, such as an electric beam, identifies if the clothes have been taken from the transfer configuration 44. If the clothes have not be removed from the configuration 44 within a prescribed time, as an example 1 minute, the translucent door 100 is closed and the transfer configuration 44 is then placed in a reverse mode of operation. The clothes are transported backward on the transfer configuration 4, and the enclosure back 106 is opened, letting the clothes exit the enclosure 26. The clothes may then be removed from the transfer configuration 44 through a clearing arrangement 24. If the user takes the clothes from the transfer configuration 44, the display prompts the user to check the clothes to verify the accuracy of the materials provided. If the user verifies that the clothes provided are accurate, the user may simply walk away and the apparatus 10 will automatically return to a pick-up mode, awaiting a further customer. If the user identifies that the clothes provided are not the ones desired, the user may return the clothes to the transfer configuration 44, wherein the configuration 44 will remove the clothes from the enclosure 26 and will be discharged from the transfer configuration 44 by the clearing arrangement 24 to a bin.

The present invention provides many features and benefits for the dry cleaning industry. The apparatus allows unattended drop off and pick up of dry cleaning. The configuration of the invention allows the apparatus to be quickly and cost effectively manufactured. The apparatus offers flexible order payment by credit card, direct billing, debit accounts or prepayment. The construction of the apparatus allows for speedy delivery of cleaned clothes to the end user. The apparatus 10 may also be configured to interface with point of sale management programs, such as DCCS, SPOT as an example. The apparatus 10 is weather resistant for both indoor and outdoor applications. The apparatus 10 allows for delivering a final clean clothes product such that the clothes do not have wrinkles due to excessive handling of customer attendants. The apparatus 10 may be configured in a modular format to allow customers which have differing floor plan arrangements to effectively install the apparatus 10 inside the desired floor plan.

In the foregoing specification, the invention has been described with reference to specific exemplary embodiments, thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A material handling apparatus comprising:
   a material delivery configuration configured to receive and transfer materials, the configuration having a first end and a second end;
   a transfer configuration connected to the first end of the material delivery configuration configured to transfer materials;
   a movable material handling arrangement configured to receive and transfer at least one piece of material supported by the arrangement to the material delivery configuration;
   a computer configured to control apparatus functions;
   a user interface configured to accept, process and provide data to a user, the user interface connected to the computer to transfer and receive data;
   a clearing arrangement configured to remove material from the transfer configuration; and
   an enclosure configured to separate the user from the movable material handling arrangement.

2. The material handling apparatus according to claim 1, further comprising:
   a material depository box configured to accept materials inserted by the user.

3. The material handling apparatus according to claim 1, wherein the user interface comprises a keypad and a card reader.

4. The material handling apparatus according to claim 3, wherein the user interface further comprises a display configured to visually output data to the user.

5. The material handling apparatus according to claim 3, further comprising:
   a selection pad configured to activate the transfer configuration and the movable material handling arrangement.

6. The material handling apparatus according to claim 1, further comprising:
   a receipt dispensing arrangement, the receipt dispensing arrangement configured to produce and provide the receipt to a user.

7. The material handling apparatus according to claim 6, wherein the receipt dispensing arrangement comprises a printer connected to the computer and a receipt slot configured to transfer a receipt produced by the printer to a user.

8. The material handling apparatus according to claim 3, wherein the card reader is configured to read magnetic cards.

9. The material handling apparatus according to claim 4, wherein the display is a color display.

10. The material handling apparatus according to claim 1, wherein the enclosure is configured with a weight analyzer.

11. The material handling apparatus according to claim 1, wherein the enclosure is weather resistant to seal the transfer configuration from an outside environment.

12. The material handling apparatus according to claim 11, wherein the enclosure is configured as a sliding door.

13. The material handling apparatus according to claim 12, wherein the enclosure houses the user interface.

14. The material handling apparatus according to claim 11, wherein the enclosure comprises
   a first panel configured to house the user interface and a second panel configured with a movable transparent door to seal the transfer configuration from an exterior environment.

15. The material handling apparatus according to claim 14, wherein the first panel and the second panel are made of weather resistant material.

16. The material handling apparatus according to claim 15, wherein the enclosure is configured with a light to allow identification of objects within the apparatus.

17. The material handling apparatus according to claim 1, wherein the user interface accepts debit cards.

18. The material handling apparatus according to claim 1, wherein the user interface accepts prepayment cards.

19. The material handling apparatus according to claim 1, wherein the transfer configuration and the movable material handling arrangement are configured to operate at approximately 1600 cycles per day.

20. The material handling apparatus according to claim 1, wherein the user interface is configured as a touch screen.

21. The material handling apparatus according to claim 7, wherein the printer is a thermal printer.

22. The material handling apparatus according to claim 1, wherein the movable material handling arrangement is configured as an electric motor connected to a rail with an ADC chain, the electric motor configured to move the ADC chain to a desired configuration.

23. The material handling apparatus according to claim 1, further comprising a scanner configured to read information and interface with the computer.

24. The material handling apparatus according to claim 1, wherein the transfer configuration comprises a drive assembly, an idler take-up assembly and a connection between the transfer configuration and the idler take-up assembly.

25. The material handling apparatus according to claim 24, wherein the connection is a chain.

26. The material handling apparatus according to claim 1, wherein the movable material handling arrangement further comprises:
   a load station configured to load clothes onto the arrangement.

27. The material handling apparatus according the claim 26, wherein the load station is further configured with an emergency stop.

28. The material handling apparatus according to claim 1, further comprising:
   an photo-eye configured to monitor movement of the movable material handling arrangement and provide data to the computer to allow indexing and
   a photo-eye reflector configured to reflect a beam of energy from the photo-eye.

29. The material handling apparatus according the claim 1, further comprising:
   a CCD camera configured to monitor movement of the movable material handling arrangement and provide data to the computer to allow indexing.

30. The material handling apparatus according to claim 2, further comprising:
   a configuration to lock the material depository box, the configuration connected to the computer to allow activation.

31. The material handling apparatus according to claim 1, wherein the material delivery configuration is configured as a rail.

32. The material handling apparatus according to claim 31, wherein the rail is made of metal.

33. The material handling apparatus according to claim 1, wherein the clearing arrangement is configured as an eccentric shaped lobed cam, wherein the lobe is configured to remove materials traveling on the transfer configuration in a single direction.

34. The material handling apparatus according to claim 33, wherein the eccentric shaped lobed cam is supported by the enclosure.

* * * * *